United States Patent
Chuang

(10) Patent No.: US 8,964,588 B2
(45) Date of Patent: Feb. 24, 2015

(54) METHOD OF PERFORMING QOS VERIFICATION IN UMTS

(71) Applicant: Acer Incorporated, New Taipei (TW)

(72) Inventor: Ming-Dao Chuang, New Taipei (TW)

(73) Assignee: Acer Incorporated, Xizhi Dist., New Taipei (TW)

( * ) Notice: Subject to any disclaimer, the term of this patent is extended or adjusted under 35 U.S.C. 154(b) by 162 days.

(21) Appl. No.: 13/685,655

(22) Filed: Nov. 26, 2012

(65) Prior Publication Data

US 2013/0223249 A1 Aug. 29, 2013

Related U.S. Application Data

(60) Provisional application No. 61/604,522, filed on Feb. 29, 2012.

(30) Foreign Application Priority Data

Apr. 10, 2012 (TW) .............................. 101112596 A

(51) Int. Cl.
H04W 28/02 (2009.01)
H04W 24/02 (2009.01)
H04W 24/08 (2009.01)
H04W 24/10 (2009.01)

(52) U.S. Cl.
CPC .............. *H04W 24/02* (2013.01); *H04W 24/08* (2013.01); *H04W 24/10* (2013.01)
USPC ...................................................... 370/252

(58) Field of Classification Search
CPC ...... H04W 24/02; H04W 24/08; H04W 24/10
USPC ......................................................... 370/252
See application file for complete search history.

(56) References Cited

U.S. PATENT DOCUMENTS

2013/0100840 A1* 4/2013 Johansson et al. ............ 370/252
2013/0114446 A1* 5/2013 Liu et al. ....................... 370/252

OTHER PUBLICATIONS

LG Electronics, "Throuphput and loss rate measurements for MDT QoS verification", Nov. 14, 2011, 3GPP TSG-RAN WG2 Meeting #76, R2-116247, pp. 1-3.*
ETSI TS 136 314 V9.1.0, LTE; Evolved Universal Terrestrial Radio Access Network (E-UTRAN); Layer 2- Measurements (3GPP TS 36.314 version 9.1.0 Release 9), cover page and p. 15-16, Jul. 2010.
3GPP TS 23.203 V8.9.0. 3rd Generation Partnership Project: Technical Specification Group Services and System Aspects; Policy and charging control architecture (Release 8), cover page and p. 28-30, Mar. 2010.
3GPP TS 24.008 V8.14.0 (Jun. 2011), "3rd Generation Partnership Project; Technical Specification Group Core Network and Terminals; Mobile radio interface Layer 3 specification; Core network protocols; Stage 3 (Release 8)", pp. 1-593.

* cited by examiner

*Primary Examiner* — Paul H Masur
(74) *Attorney, Agent, or Firm* — Winston Hsu; Scott Margo

(57) ABSTRACT

According to one or multiple transmission parameters, one or multiple measurement targets are set for a plurality of data links provided by a user equipment in UMTS. The data throughput of each measurement target during a specific period is summed up for acquiring an uplink scheduled IP throughput and a downlink scheduled IP throughput of each measurement target.

5 Claims, 3 Drawing Sheets

| 8 | 7 | 6 | 5 | 4 | 3 | 2 | 1 | |
|---|---|---|---|---|---|---|---|---|
| Quality of service ||||||||  Octet 1 |
| Length of quality of service |||||||| Octet 2 |
| Spare || Delay class ||| Reliability class ||| Octet 3 |
| Peak throughput |||| Spare | Precedence class ||| Octet 4 |
| Spare ||| Mean throughput ||||| Octet 5 |
| Traffic class ||| Delivery order || Delivery of erroneous service data unit (SDU) ||| Octet 6 |
| Maximum SDU size |||||||| Octet 7 |
| Maximum bit rate for uplink |||||||| Octet 8 |
| Maximum bit rate for downlink |||||||| Octet 9 |
| Residual bit error rate (BER) |||| SDU error ratio |||| Octet 10 |
| Transfer delay ||||| Traffic handling priority ||| Octet 11 |
| Guaranteed bit rate for uplink |||||||| Octet 12 |
| Guaranteed bit rate for downlink |||||||| Octet 13 |
| Spare ||| Signaling indication | Source statistics descriptor |||| Octet 14 |
| Maximum bit rate for downlink (extended) |||||||| Octet 15 |
| Guaranteed bit rate for downlink (extended) |||||||| Octet 16 |
| Maximum bit rate for uplink (extended) |||||||| Octet 17 |
| Guaranteed bit rate for uplink (extended) |||||||| Octet 18 |

FIG. 2

| 8 | 7 | 6 | 5 | 4 | 3 | 2 | 1 | |
|---|---|---|---|---|---|---|---|---|
| Radio priority information element |||| Spare | Radio priority level values ||| Octet 1 |

FIG. 3

| Resource type parameter | Guaranteed bit rate for uplink |
| --- | --- |
| | Guaranteed bit rate for downlink |
| | Guaranteed bit rate for uplink (extended) |
| | Guaranteed bit rate for downlink (extended) |
| Priority parameter | Precedence class |
| | Traffic handling priority |
| | Radio priority level value |
| Packet delay budget parameter | Transfer delay |
| | Delay class |
| Packet error loss rate parameter | SDU error ratio |

FIG. 4

METHOD OF PERFORMING QOS VERIFICATION IN UMTS

CROSS REFERENCE TO RELATED APPLICATIONS

This application claims priority of U.S. Patent Application No. 61/604,522 filed on Feb. 29, 2012 and TW Patent Application No. 101112596 filed on Apr. 10, 2012, which is included in its entirety herein by reference.

BACKGROUND OF THE INVENTION

1. Field of the Invention

The present invention is related to a method of performing QoS measurement in UMTS, and more particularly, to a method of performing QoS measurement in UMTS for providing MDT mobility optimization.

2. Description of the Prior Art

The 3rd Generation Partnership Project (3GPP) has developed a universal mobile telecommunications system (UMTS) which adopts a wideband code division multiple access (WCDMA) technology capable of providing high frequency spectrum utilization, universal coverage, and high-speed/quality multimedia data transmission. In the UMTS, a radio access network known as a universal terrestrial radio access network (UTRAN) includes multiple Node-Bs (NBs) for communicating with multiple user equipments (UEs). Furthermore, a long-term evolution (LTE) system is now being developed by the 3GPP in order to further improve performance of the UMTS to satisfy users' increasing needs. The LTE system includes a new radio interface and radio network architecture which provides a high data rate, low latency, packet optimization, and improved system capacity and coverage. In the LTE system, a radio access network known as an evolved UTRAN (E-UTRAN) includes multiple evolved NBs (eNBs) for communicating with multiple UEs and a core network which includes a mobility management entity (MME), a serving gateway and other devices for NAS (Non Access Stratum) control.

NBs of the wireless communication system must be deployed properly in order to provide seamless, high quality and large signal coverage without experiencing call drops or signal degradation. However, planning and optimizing the deployment of the NBs are based on signal quality measurements which may be time- and effort consuming for an operator of the wireless communication system. Common methods of performing the measurements include measuring the signal strength or quality at different time and geographical locations of interest. Therefore, it is more economical for a UE of the wireless communication to perform the measurements and send the measurement report to an NB. Based on the measurement reports received from multiple UEs, the deployment of the NBs may be planned and optimized accordingly without spending many human and material resources. The minimization of drive test (MDT) has been proposed in current 3GPP specifications in order to perform coverage optimization, mobility optimization, capacity optimization and Quality of Service (QoS) verification. However, the MDT mobility optimization in LTE systems has not been addressed.

SUMMARY OF THE INVENTION

The present invention provides a method of performing QoS measurement in UMTS. The method includes setting a plurality of measurement targets among a plurality of data links provided by a user equipment according to a transmission parameter; selecting a specific period; and acquiring an uplink scheduled IP throughput and a downlink scheduled IP throughput of each measurement target by summing up data throughput of each measurement target during the specific period.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a diagram illustrating a QoS information element defined for UMTS according to 3GPP specifications.

FIG. 3 is a diagram illustrating a radio priority information element defined for UMTS according to 3GPP specifications.

FIG. 4 is a diagram illustrating a QoS lookup table defined for data link in UMTS according to the present invention.

DETAILED DESCRIPTION

Figure 1:
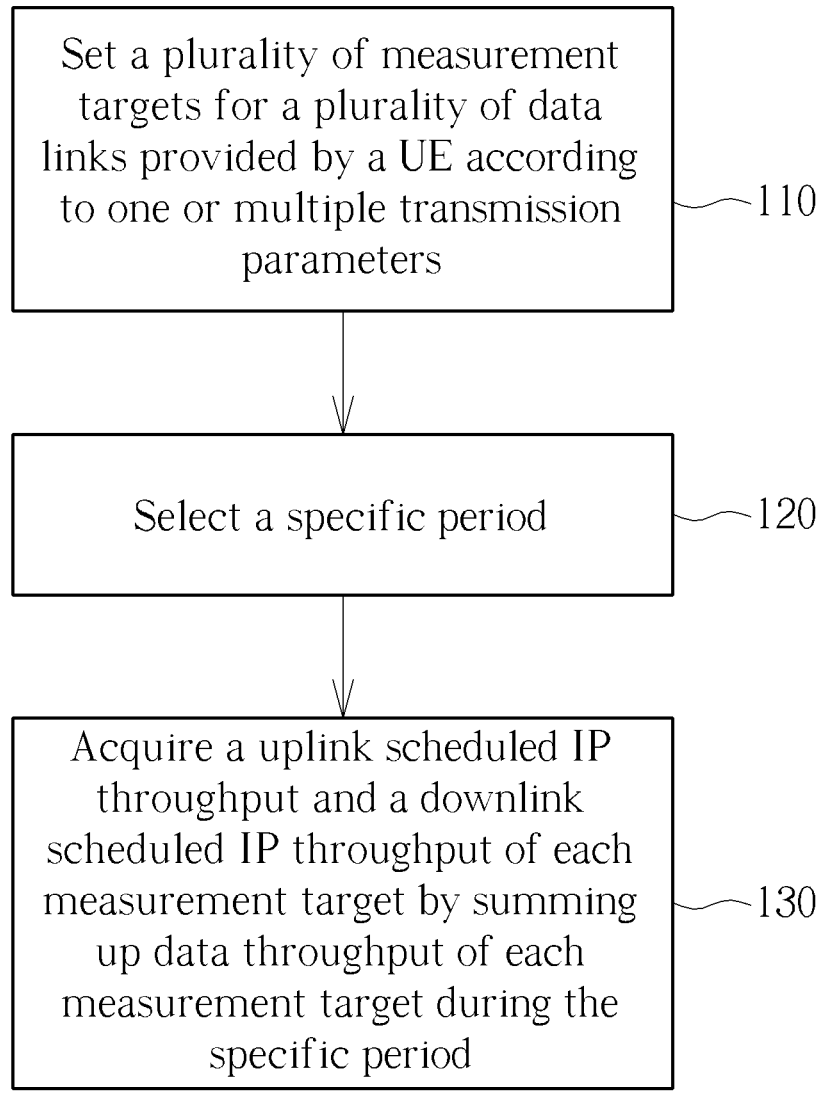
FIG. 1 is a flowchart illustrating a method of performing QoS measurement in UMTS according to the present invention.

The present invention provides a method of performing QoS measurement in UMTS by measuring schedule Internet Protocol (IP) throughput using radio network controller (RNC), Node-B (NB), relay node (RN) or user equipment (UE).

FIG. 1 is a flowchart illustrating a method of performing QoS measurement in UMTS according to the present invention. The flowchart in FIG. 1 includes the following steps:

Step 110: set a plurality of measurement targets for a plurality of data links provided by a UE according to one or multiple transmission parameters.

Step 120: select a specific period.

Step 130: acquire a uplink scheduled IP throughput and a downlink scheduled IP throughput of each measurement target by summing up data throughput of each measurement target during the specific period.

In an embodiment of step 110, each measurement target may includes a single data link, such as a single radio access bearer (RAB), a single packet data protocol (PDP), a single network service access point identifier, or a single logic link control service access point identifier (LLC SAPI). If the UE provides M data links, N (N is a positive integer smaller than or equal to M) corresponding measurement targets may be set in step 110, which is explained in more details in FIGS. 2-4.

FIG. 2 is a diagram illustrating a QoS information element defined for UMTS according to 3GPP specifications (such as TS 24.008). PDP context is the router information for packet transmission in UMTS internal network, and the QoS information element may define QoS parameters for PDP context. The QoS information element may includes a plurality of octets (Octet 1~Octet 18) whose length ranges from 14 octets (ex. Octet 1~Octet 14) to 18 octets (ex. Octet 1~Octet 18). Each octet is encoded in a manner as depicted in FIG. 2 and the corresponding parameters are explained as follows:

Octet1: Quality of service
Octet2: Length of quality of service
Octet3: spare, Delay class, Reliability class
Octet4: Peak throughput, spare, Precedence class
Octet5: spare, Mean throughput
Octet6: Traffic class, Delivery order, Delivery of erroneous service data unit (SDU)

Octet7: Maximum SDU size
Octet8: Maximum bit rate for uplink
Octet9: Maximum bit rate for downlink
Octet10: Residual bit error rate (BER), SDU error ratio
Octet11: Transfer delay, Traffic handling priority
Octet12: Guaranteed bit rate for uplink
Octet13: Guaranteed bit rate for downlink
Octet14: spare, Signaling indication, Source statistics descriptor
Octet15: Maximum bit rate for downlink (extended)
Octet16: Guaranteed bit rate for downlink (extended)
Octet17: Maximum bit rate for uplink (extended)
Octet18: Guaranteed bit rate for uplink (extended)

FIG. 3 is a diagram illustrating a radio priority information element defined for UMTS according to 3GPP specifications (such as TS 24.008). The radio priority information element indicates the priority of the NB when data associated with PDP context or short message service (SMS) is transmitted via bottom layer. The radio priority information element includes one octet in which bit 1~bit 3 represent radio priority level values, depicted as follows:

| bit 3 | bit 2 | bit 1 | priority level |
|---|---|---|---|
| 0 | 0 | 1 | 1 (highest) |
| 0 | 1 | 0 | 2 |
| 0 | 1 | 1 | 3 |
| 1 | 0 | 0 | 4 (lowest) |
| other | | | |

FIG. 4 is a diagram illustrating a QoS lookup table defined for data link in UMTS according to the present invention. According to the QoS information element depicted in FIG. 2 and the radio priority information element depicted in FIG. 3, the QoS lookup table includes resource type parameter, priority parameter, packet delay budget parameter and packet error loss rate parameter. The resource type parameter may include guaranteed bit rate for uplink, guaranteed bit rate for downlink, guaranteed bit rate for uplink (extended), or guaranteed bit rate for downlink (extended). The priority parameter may include precedence class, traffic handling priority, or radio priority level value. The packet delay budget parameter may include transfer delay or delay class. The packet error loss rate parameter may include SDU error ratio.

For executing step 110 according to the embodiments illustrated in FIGS. 2-4, the measurement target may be determined according to the UMTS QoS lookup table illustrated in FIG. 4. Assume that the UE provides three data links DL1-DL3. Among the resource type parameter, the priority parameter, the packet delay budget parameter and the packet error loss rate parameter illustrated in FIG. 4, if one or multiple parameters of the data links DL1 and DL2 have similar values, two measurement targets may be set in step 110, wherein the first measurement target includes the data links DL1-DL2 and the second measurement target includes the data link DL3; if none of the parameters of the data links DL1 and DL2 has similar value, three measurement targets may be set in step 110, wherein the first measurement target includes the data link DL1, the second measurement target includes the data link DL2, and the third measurement target includes the data link DL3.

In step 120, the specific period may be determined based on two timing parameters T1 and T2. T1 is the point in time when the packet data convergence protocol (PDCP) is emptied. T2 is the point in time when the PDCP is available for transmission.

In step 130, the uplink scheduled IP throughput and the downlink scheduled IP throughput of each measurement target may be acquired by summing up data throughput of each measurement target during the specific period. For a specific measurement target, the uplink scheduled IP throughput and the downlink scheduled IP throughput may be calculated as follows:

$$\text{uplink scheduled } IP \text{ throughput} = \frac{\sum ThpVolU1}{\sum ThpTimeU1} \times 1000 \text{ (kbits/s)}, \sum ThpTimeU1 > 0$$

$$\text{downlink scheduled } IP \text{ throughput} = \frac{\sum ThpVolD1}{\sum ThpTimeD1} \times 1000 \text{ (kbits/s)}, \sum ThpTimeD1 > 0$$

ThpTimeU1 is the time required for transmitting a data burst during uplink, and ThpTimeU1 is the time required for transmitting a data burst during downlink. ThoVolU1 is the volume of a data burst during uplink, and ThoVolD1 is the volume of a data burst during downlink. When the data burst length is smaller than a hybrid automatic repeat request (HARQ) transmission, ThoVolU1=ThoVol1=0. When the data burst length is larger than an HARQ transmission, multiple transmission time intervals (TTIs) are required and ThoVolU1=ThoVol1=(T1-T2).

In conclusion, the present invention provides a method of performing QoS measurement in UMTS. According to the QoS information element and the radio priority information element defined in 3GPP specifications, the present invention provides a QoS lookup table which includes resource type parameter, priority parameter, packet delay budget parameter and packet error loss rate parameter. A plurality of measurement targets may then be set according to the QoS lookup table for measuring scheduled IP throughput.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A method of performing Quality of Service (QoS) measurement in a universal mobile telecommunications system (UMTS), comprising:
 a user equipment providing a plurality of data links and setting a plurality of measurement targets among the plurality of data links;
 the user equipment selecting a specific period;
 the user equipment determining a first transmission parameter according to a QoS information element or a radio priority information element defined in a 3rd Generation Partnership Project (3GPP) specification;
 the user equipment acquiring a first value associated with the first transmission parameter of a first data link among the plurality of data links;

the user equipment acquiring a second value associated with the first transmission parameter of a second data link among the plurality of data links;

the user equipment including the first data link in a first measurement target among the plurality of measurement targets and including the second data link in a second measurement target among the plurality of measurement targets when a difference between the first value and the second value is larger than a predetermined value or including both the first data link and the second data link in the first measurement target when the difference between the first value and the second value is not larger than the predetermined value; and the user equipment acquiring an uplink scheduled Internet Protocol (IP) throughput and a downlink scheduled IP throughput of each measurement target by summing up data throughput of each measurement target during the specific period.

2. The method of claim 1, wherein the first transmission parameter includes a resource type parameter, a priority parameter, a packet delay budget parameter or a packet error loss rate parameter.

3. The method of claim 2, wherein:

the resource type parameter includes a guaranteed bit rate for uplink, a guaranteed bit rate for downlink, an extended guaranteed bit rate for uplink, or an extended guaranteed bit rate for downlink;

the priority parameter includes a precedence class or a traffic handling priority of the QoS information element, or a radio priority level value of the radio priority information element;

the packet delay budget parameter includes a transfer delay or a delay class; and the packet error loss rate parameter includes a service data unit (SDU) error ratio.

4. The method of claim 1, wherein each data link includes a radio access bearer (RAB), a packet data protocol (PDP), a network service access point identifier, or a logic link control service access point identifier (LLC SAPI).

5. A method of performing Quality of Service (QoS) measurement in a universal mobile telecommunications system (UMTS), comprising:

a user equipment providing a plurality of data links and setting a plurality of measurement targets among the plurality of data links;

the user equipment selecting a specific period;

the user equipment determining a first transmission parameter and a second transmission parameter according to a QoS information element or a radio priority information element defined in a 3rd Generation Partnership Project (3GPP) specification;

the user equipment acquiring a first value associated with the first transmission parameter and a second value associated with the second transmission parameter for a first data link among the plurality of data links;

the user equipment acquiring a third value associated with the first transmission parameter and a fourth value associated with the second transmission parameter for a second data link among the plurality of data links;

the user equipment including the first data link and the second data link in a first measurement target among the plurality of measurement targets when a difference between the first value and the third value is not larger than a first predetermined value and a difference between the second value and the fourth value is not larger than a second predetermined value; and the user equipment acquiring an uplink scheduled Internet Protocol (IP) throughput and a downlink scheduled IP throughput of each measurement target by summing up data throughput of each measurement target during the specific period.

* * * * *